(12) United States Patent
Branson et al.

(10) Patent No.: US 9,189,212 B2
(45) Date of Patent: Nov. 17, 2015

(54) PREDICTED OUTPUTS IN A STREAMING ENVIRONMENT

(71) Applicant: International Business Machines Corporation, Armonk, NY (US)

(72) Inventors: Michael J. Branson, Rochester, MN (US); John M. Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 38 days.

(21) Appl. No.: 14/230,376

(22) Filed: Mar. 31, 2014

(65) Prior Publication Data

US 2015/0277862 A1 Oct. 1, 2015

(51) Int. Cl.
*G06F 9/45* (2006.01)
*G06F 17/30* (2006.01)

(52) U.S. Cl.
CPC .... *G06F 8/41* (2013.01); *G06F 8/423* (2013.01); *G06F 8/443* (2013.01); *G06F 17/30958* (2013.01)

(58) Field of Classification Search
None
See application file for complete search history.

(56) References Cited

U.S. PATENT DOCUMENTS

| 7,613,848 | B2 | 11/2009 | Amini et al. | |
|---|---|---|---|---|
| 7,644,110 | B2 | 1/2010 | Nishizawa et al. | |
| 8,095,690 | B2 | 1/2012 | Kashiyama et al. | |
| 2005/0289138 | A1* | 12/2005 | Cheng et al. | 707/5 |
| 2009/0178031 | A1* | 7/2009 | Zhao | 717/143 |
| 2010/0318516 | A1* | 12/2010 | Kolen et al. | 707/736 |
| 2012/0179809 | A1* | 7/2012 | Barsness et al. | 709/224 |
| 2012/0218268 | A1 | 8/2012 | Accola et al. | |
| 2012/0222020 | A1* | 8/2012 | Duftler et al. | 717/143 |
| 2013/0031124 | A1 | 1/2013 | Santosuosso et al. | |
| 2013/0054779 | A1* | 2/2013 | Cradick et al. | 709/224 |
| 2013/0080653 | A1 | 3/2013 | Santosuosso et al. | |
| 2013/0166888 | A1 | 6/2013 | Branson et al. | |
| 2015/0169714 | A1* | 6/2015 | Imai et al. | 707/602 |

OTHER PUBLICATIONS

Chailloux, "IBM InfoSphere Streams Technical Overview," IBM, Feb. 21, 2013.*
Schneider et al., "Auto-Parallelizing Stateful Distributed Streaming Applications," 2012 ACM.*

(Continued)

*Primary Examiner* — Insun Kang
(74) *Attorney, Agent, or Firm* — James R. Nock; Nicholas D. Bowman

(57) ABSTRACT

According to embodiments of the disclosure, methods, systems, and computer program products for initializing a streaming application are disclosed. The method may include compiling code on a compiler system, the compiling of the code including establishing an operator graph having a plurality of processing elements including a first processing element and a second processing element. The compiling of code including receiving a first compiler directive specifying an operator sub-graph included in the operator graph, the operator sub-graph containing one or more processing elements from the plurality of processing elements. The compiling of code including receiving a second compiler directive identifying the first processing element, the first processing element configured to bypass the operator sub-graph by transmitting a predicted output tuple to the second processing element in response to determining that a processing condition exists in the operator graph.

16 Claims, 7 Drawing Sheets

(56) References Cited

OTHER PUBLICATIONS

Yong et al., "A Prediction Framework for Distributed Data Stream Processing," 2009 Pacific-Asia Conference on Circuits, Communications and System.*

Chen et al., "Data Stream Prediction in Distributed Stream Processing Environment," IEEE, 2012.*

Neumann et al., "Efficiently Compiling Efficient Query Plans for Modern Hardware," Proceedings of the VLDB Endowment, vol. 4, No. 9 Copyright 2011 VLDB Endowment.*

Dylan, "An Analysis of Stream processing Languages," Macquarie University, 2009.*

Ballard et al., "IBM InfoSphere Streams: Harnessing Data in Motion", IBM Redbooks, Sep. 2010, 360 pages, © International Business Machines Corporation 2010 http://www.redbooks.ibm.com/abstracts/sg247865.html.

* cited by examiner

PREDICTED OUTPUTS IN A STREAMING ENVIRONMENT

BACKGROUND

This disclosure generally relates to stream computing, and in particular, to computing applications that receive streaming data and process the data as it is received.

Database systems are typically configured to separate the process of storing data from accessing, manipulating, or using data stored in a database. More specifically, database systems use a model in which data is first stored and indexed in a memory before subsequent querying and analysis. In general, database systems may not be well suited for performing real-time processing and analyzing streaming data. In particular, database systems may be unable to store, index, and analyze large amounts of streaming data efficiently or in real time.

SUMMARY

Embodiments of the disclosure provide a method, system, and computer program product for processing data. The method, system, and computer program product receive two or more tuples to be processed by a plurality of processing elements operating on one or more computer processors.

A method for initializing a streaming application, the method including compiling code on a compiler system, the compiling of the code including establishing an operator graph having a plurality of processing elements including a first processing element and a second processing element. The method may include receiving a first compiler directive specifying an operator sub-graph included in the operator graph. The operator sub-graph may contain one or more processing elements from the plurality of processing elements. The operator sub-graph may be configured to receive an input tuple and configured to transmit an output tuple to the second processing element of the operator graph. The method may include receiving a second compiler directive identifying the first processing element. The first processing element may be configured to bypass the operator sub-graph by transmitting a predicted output tuple to the second processing element in response to determining that a processing condition exists in the operator graph. The first processing element may be configured to bypass the operator sub-graph is in response to determining that a processing condition exists in the operator sub-graph.

The method may further include receiving a third compiler directive specifying the processing condition for the operator graph. The processing condition may include determining that a number of tuples to be processed in the operator graph is greater than a latency threshold. The processing condition may include determining that a used buffer capacity parameter is greater than a buffer threshold. The processing condition may include determining the predicted time required to process the input tuple is greater than a time threshold. The processing condition may include determining that a CPU usage of the plurality of processing elements is greater than a CPU threshold. The predicted output tuple may be selected from one or more predicted output tuples stored in a prediction table. The predicted output tuple may be selected based on historical values of output tuples. The predicted output tuple may be selected based on a received input tuple.

A computer program product for processing a stream of tuples, the computer program product comprising a computer readable storage medium having program code embodied therewith, the program code include computer readable program code which may be configured at compile time to establish an operator graph having a plurality of processing elements including a first processing element and a second processing element. The code may be configured at compile time to transmit a first compiler directive specifying an operator sub-graph included in the operator graph, the operator sub-graph containing one or more processing elements from the plurality of processing elements, the operator sub-graph configured to receive an input tuple and configured to transmit an output tuple to the second processing element of the operator graph. The code may be configured at compile time to transmit a second compiler directive identifying the first processing element, the first processing element configured to bypass the operator sub-graph by transmitting a predicted output tuple to the second processing element in response to determining that a processing condition exists in the operator graph.

The first processing element may be configured to bypass the operator sub-graph is in response to determining that a processing condition exists in the operator sub-graph. The code may be further configured to transmit a third compiler directive specifying the processing condition for the graph.

A system for processing a stream of tuples may include a plurality of compute nodes, the plurality of compute nodes each having one or more processing elements to receive a stream of tuples, the processing elements operating on one or more computer processors, each processing element having one or more stream operators. The system may include a stream manager, the stream manager configured to monitor the plurality of compute nodes and to determine whether a processing condition exists in the plurality of compute nodes. The system may also include a compiler.

The compiler may be configured to receive a first compiler directive specifying one or more processing elements of the plurality of compute nodes to include in an operator sub-graph. The compiler may be configured to receive a second compiler directive identifying a first processing element of the one or more processing elements to bypass the operator sub-graph by transmitting one or more of the predicted output tuples to a second processing element of the plurality of compute nodes, in response to determining that a processing condition exists in the plurality of compute nodes. The first processing element may be configured to bypass the operator sub-graph is in response to determining that a processing condition exists in the operator sub-graph.

DETAILED DESCRIPTION

Figure 1:
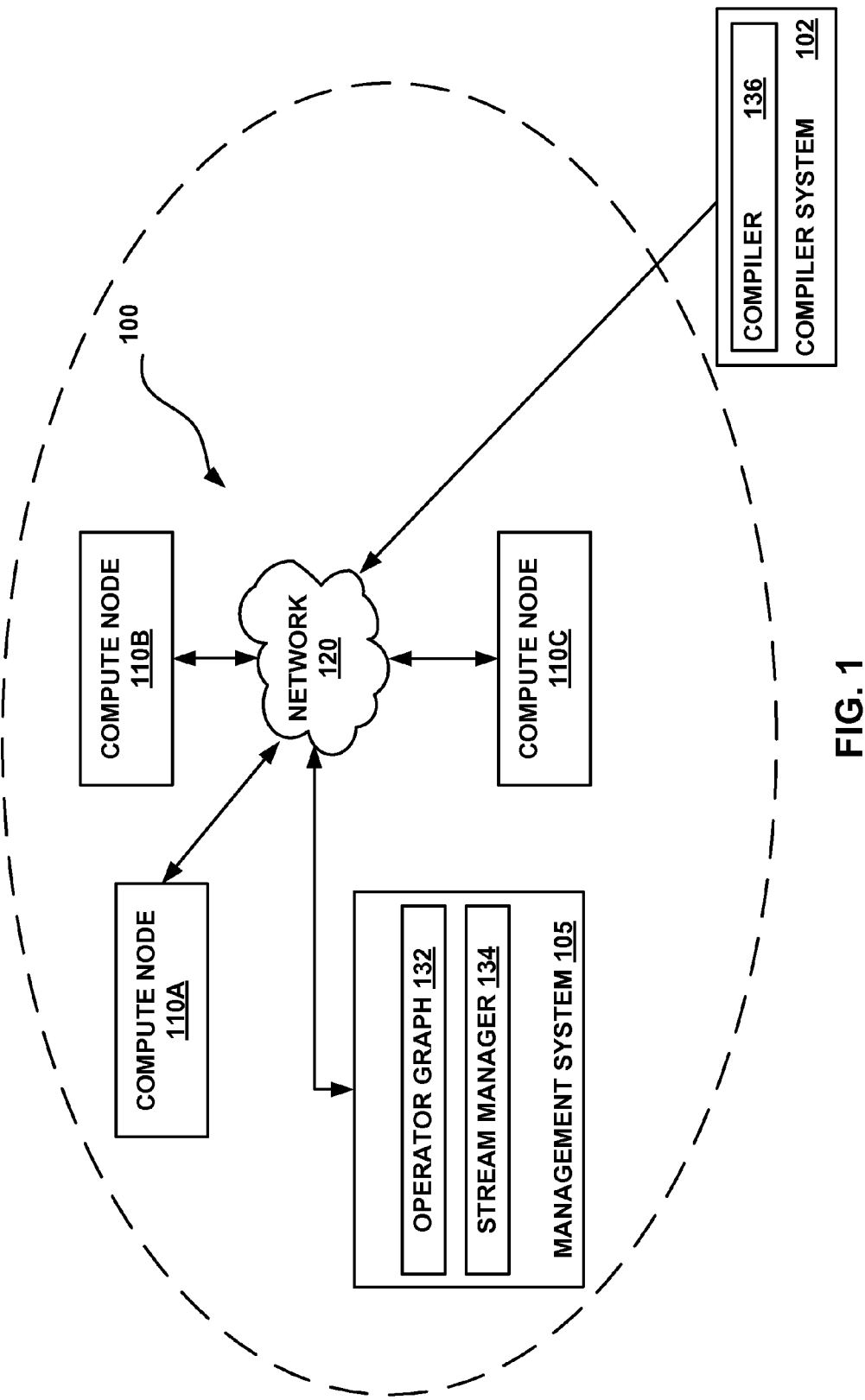
FIG. 1 illustrates a computing infrastructure configured to execute a stream computing application according to various embodiments.

Aspects of the present disclosure are generally directed to compiler directed replacement of one or more output tuples with predicted tuples in an operator graph of processing elements. While the present disclosure is not necessarily limited to such applications, various aspects of the disclosure may be appreciated through a discussion of various examples using this context.

While the same nomenclature and same numbers may be used to identify elements throughout the disclosure, this practice is not intended to limit the scope of the disclosure. Identified elements in one figure may not be identical to other same named or identified elements in other figures.

Stream-based computing and stream-based database computing are emerging as a developing technology for database systems. Products are available which allow users to create applications that process and query streaming data before it reaches a database file. With this emerging technology, users can specify processing logic to apply to inbound data records while they are "in flight," with the results available in a very short amount of time, often in fractions of a second. Constructing an application using this type of processing has opened up a new programming paradigm that will allow for development of a broad variety of innovative applications, systems, and processes, as well as present new challenges for application programmers and database developers.

In a stream computing application, stream operators are connected to one another such that data flows from one stream operator to the next (e.g., over a TCP/IP socket). When a stream operator receives data, it may perform operations, such as analysis logic, which may change the tuple by adding or subtracting attributes, or updating the values of existing attributes within the tuple. When the analysis logic is complete, a new tuple is then sent to the next stream operator. Scalability is achieved by distributing an application across nodes by creating executables (i.e., processing elements), as well as replicating processing elements on multiple nodes and load balancing among them. Stream operators in a stream computing application can be fused together to form a processing element that is executable. Doing so allows processing elements to share a common process space, resulting in much faster communication between stream operators than is available using inter-process communication techniques (e.g., using a TCP/IP socket). Further, processing elements can be inserted or removed dynamically from an operator graph representing the flow of data through the stream computing application. A particular stream operator may not reside within the same operating system process as other stream operators. In addition, stream operators in the same operator graph may be hosted on different nodes, e.g., on different compute nodes or on different cores of a compute node.

Data flows from one stream operator to another in the form of a "tuple." A tuple is a sequence of one or more attributes associated with an entity. Attributes may be any of a variety of different types, e.g., integer, float, Boolean, string, etc. The attributes may be ordered. In addition to attributes associated with an entity, a tuple may include metadata, i.e., data about the tuple. A tuple may be extended by adding one or more additional attributes or metadata to it. As used herein, "stream" or "data stream" refers to a sequence of tuples. Generally, a stream may be considered a pseudo-infinite sequence of tuples.

Tuples are received and output by stream operators and processing elements. An input tuple corresponding with a particular entity that is received by a stream operator or processing element, however, is generally not considered to be the same tuple that is output by the stream operator or processing element, even if the output tuple corresponds with the same entity or data as the input tuple. An output tuple need not be changed in some way from the input tuple.

Nonetheless, an output tuple may be changed in some way by a stream operator or processing element. An attribute or metadata may be added, deleted, or modified. For example, a tuple will often have two or more attributes. A stream operator or processing element may receive the tuple having multiple attributes and output a tuple corresponding with the input tuple. The stream operator or processing element may only change one of the attributes so that all of the attributes of the output tuple except one are the same as the attributes of the input tuple.

Generally, a particular tuple output by a stream operator or processing element may not be considered to be the same tuple as a corresponding input tuple even if the input tuple is not changed by the processing element. However, to simplify the present description and the claims, an output tuple that has the same data attributes or is associated with the same entity as a corresponding input tuple will be referred to herein as the same tuple unless the context or an express statement indicates otherwise.

Stream computing applications may handle massive volumes of data that need to be processed efficiently and in real time. For example, a stream computing application may continuously ingest and analyze hundreds of thousands of messages per second and up to petabytes of data per day. Accordingly, each stream operator in a stream computing application may be required to process a received tuple within fractions of a second. Unless the stream operators are located in the same processing element, it is necessary to use an inter-process communication path each time a tuple is sent from one stream operator to another. Inter-process communication paths can be a critical resource in a stream computing application. According to various embodiments, the available bandwidth on one or more inter-process communication paths may be conserved. Efficient use of inter-process communication bandwidth can speed up processing.

Stream operators may transmit a tuple in an operator graph (described further herein). Generally, the operator graph can have a plurality of stream operators that produce a particular end result, e.g., calculate an average. The operator graph can have a splitting stream operator also referred to as a split operator. The split operator can be a stream operator that has output ports. Each output port on the split operator can route tuples to a plurality of processing branches. The split operator can route the tuples to the processing branches using a variety of routing methods, e.g., randomly, based on the type of processing that a processing branch performs, in intervals, etc.

Each processing branch can have one or more stream operators configured to perform a particular calculation and produce a different processing result. For example, if a processing branch is configured to calculate an average calculation. Then the processing branch can have a stream operator configured to count each attribute value in a tuple, and another stream operator calculate a total of all attribute values.

Because stream computing applications may deal with large volumes of data, the processing of which may be spread over multiple processing elements across multiple compute nodes, a processing element may need to produce an output faster than it is able. Instead of requiring a processing element to generate output data by processing currently received input data, a processing element may instead output prediction data, in lieu of the output data, and bypass one or more processing elements. This prediction data (or predicted output data) may be known prior to the compiling of stream computing applications. The predicted output data may be located in a computer storage and accessed by stream computing applications to substitute for generated outputs. However, in other embodiments, the predicted output data may be generated based on historical values of output data. In an embodiment, the predicted output data may also be based on, for example, an average of the output data that was previously processed and transmitted by the processing element. Using the predicted output data may allow the processing element to transmit output data faster, or with less processing, than it otherwise would be able.

Moreover, the processing element may output predetermined data only if there is a need to limit or stop processing received input data. For example, the stream computing application may be experiencing backpressure. "Backpressure" is a term used to describe one or more processing elements that are unable to transmit or receive additional data because either their buffer or a buffer associated with a downstream processing element is full. In the case of some real-time applications, the processing element may trade accuracy for increased data throughput where the time required for data to propagate through the stream computing application is an important factor. It may be advantageous to allow for predicted output data to substitute for generated data in some instances in order to reduce backpressure in a stream computing application. Processing conditions, explained further below, in the operator graph may be identified which signal that the operator graph is experiencing backpressure.

A method for initializing a streaming application may include compiling code on a compiler system. The compiling of the code may include establishing an operator graph having a plurality of processing elements including a first processing element and a second processing element. The compiling may include receiving a first compiler directive specifying an operator sub-graph included in the operator graph, the operator sub-graph containing one or more processing elements from the plurality of processing elements. The operator sub-graph may be configured to receive an input tuple and configured to transmit an output tuple to the second processing element. The method may also include receiving a second compiler directive specifying the first processing element, the first processing element modified to bypass the operator sub-graph by transmitting a predicted output tuple to the second processing element in response to determining that a processing condition exists in the operator graph.

FIG. 1 illustrates one exemplary computing infrastructure 100 that may be configured to execute a stream computing application, according to some embodiments. The computing infrastructure 100 includes a management system 105 and two or more compute nodes 110A-110C—i.e., hosts—which are communicatively coupled to each other using one or more communications networks 120. The communications network 120 may include one or more servers, networks, or databases, and may use a particular communication protocol to transfer data between the compute nodes 110A-110C. A compiler system 102 may be communicatively coupled with the management system 105 and the compute nodes 110 either directly or via the communications network 120.

The communications network 120 may include a variety of types of physical communication channels or "links." The links may be wired, wireless, optical, or any other suitable media. In addition, the communications network 120 may include a variety of network hardware and software for performing routing, switching, and other functions, such as routers, switches, or bridges. The communications network 120 may be dedicated for use by a stream computing application or shared with other applications and users. The communications network 120 may be any size. For example, the communications network 120 may include a single local area network or a wide area network spanning a large geographical area, such as the Internet. The links may provide different levels of bandwidth or capacity to transfer data at a particular rate. The bandwidth that a particular link provides may vary depending on a variety of factors, including the type of communication media and whether particular network hardware or software is functioning correctly or at full capacity. In addition, the bandwidth that a particular link provides to a stream computing application may vary if the link is shared with other applications and users. The available bandwidth may vary depending on the load placed on the link by the other applications and users. The bandwidth that a particular link provides may also vary depending on a temporal factor, such as time of day, day of week, day of month, or season.

Figure 2:
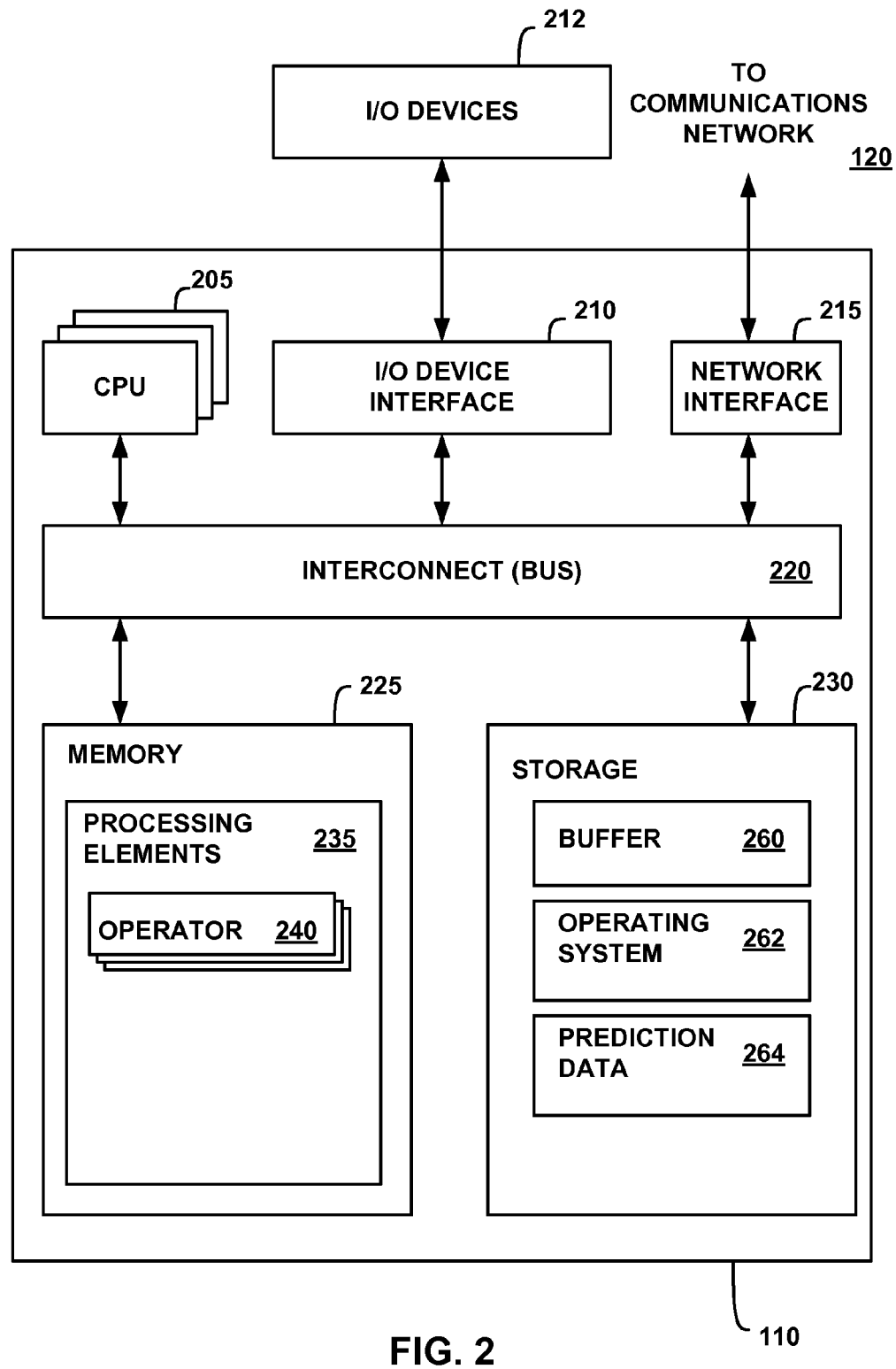
FIG. 2 illustrates a more detailed view of a compute node of FIG. 1 according to various embodiments.

FIG. 2 is a more detailed view of a compute node 110, which may be the same as one of the compute nodes 110A-110D of FIG. 1, according to various embodiments. The compute node 110 may include, without limitation, one or more processors (CPUs) 205, a network interface 215, an interconnect 220, a memory 225, and a storage 230. The compute node 110 may also include an I/O device interface 210 used to connect I/O devices 212, e.g., keyboard, display, and mouse devices, to the compute node 110.

Each CPU 205 retrieves and executes programming instructions stored in the memory 225 or storage 230. Similarly, the CPU 205 stores and retrieves application data residing in the memory 225. The interconnect 220 is used to transmit programming instructions and application data between each CPU 205, I/O device interface 210, storage 230, network interface 215, and memory 225. The interconnect 220 may be one or more busses. The CPUs 205 may be a single CPU, multiple CPUs, or a single CPU having multiple processing cores in various embodiments. In one embodiment, a processor 205 may be a digital signal processor (DSP). One or more processing elements 235 (described below) may be stored in the memory 225. A processing element 235 may include one or more stream operators 240 (described below). In one embodiment, a processing element 235 is assigned to be executed by only one CPU 205, although in other embodiments the stream operators 240 of a processing element 235 may include one or more threads that are executed on two or more CPUs 205. The memory 225 is generally included to be representative of a random access memory, e.g., Static Random Access Memory (SRAM), Dynamic Random Access Memory (DRAM), or Flash. The storage 230 is generally included to be representative of a non-volatile memory, such as a hard disk drive, solid state device (SSD), or removable memory cards, optical storage, flash memory devices, network attached storage (NAS), or connections to storage area network (SAN) devices, or other devices that may store non-volatile data. The network interface 215 is configured to transmit data via the communications network 120.

A stream computing application may include one or more stream operators 240 that may be compiled into a "processing element" container 235. The memory 225 may include two or more processing elements 235, each processing element having one or more stream operators 240. Each stream operator 240 may include a portion of code that processes tuples flowing into a processing element and outputs tuples to other stream operators 240 in the same processing element, in other processing elements, or in both the same and other processing elements in a stream computing application. Processing elements 235 may pass tuples to other processing elements that are on the same compute node 110 or on other compute nodes that are accessible via communications network 120. For example, a processing element 235 on compute node 110A may output tuples to a processing element 235 on compute node 110B.

The storage 230 may include a buffer 260. The buffer 260 may include storage space for data flowing into the compute node 110 from upstream processing elements 235 or from a data source for the stream computing application. For example, a processing element 235 may include data tuples waiting to be processed by one of the processing elements 235. The buffer 260 may also store output tuples intended for downstream processing elements 235 if the downstream processing element 235 has a full buffer, such as when the operator graph is experiencing backpressure. Although shown as being in storage, the buffer 260 may be located in the memory 225 of the compute node 110 or in a combination of both memories. Moreover, storage 230 may include storage space that is external to the compute node 110, such as in a cloud.

The buffer 260 may also be used to determine when a processing condition exists in the operator graph. In an embodiment, the processing condition may be the existence of backpressure, or latency, in the stream computing application. In an embodiment, the processing condition may include determining whether the number of tuples to be processed in an operator graph is greater than a latency threshold. The substitution of prediction data 264 for output of an operator sub-graph may decrease latency and backpressure in the stream computing application. The processing condition may include a capacity use of the data storage of the buffer 260 in the compute node 110. For example, the processing condition may include determining whether a used buffer capacity parameter is greater than a buffer threshold. In an embodiment, the used buffer capacity threshold may be 90% used capacity in the buffer so that if the used buffer capacity parameter is greater than 90% the processing condition is triggered.

The compute node 110 may include one or more operating systems 262. An operating system 262 may be stored partially in memory 225 and partially in storage 230. Alternatively, an operating system may be stored entirely in memory 225 or entirely in storage 230. The operating system provides an interface between various hardware resources, including the CPU 205, and processing elements and other components of the stream computing application. In addition, an operating system provides common services for application programs, such as providing a time function.

The compute node 110 may also include prediction data 264. Prediction data 264 may be stored partially in memory 225 and partially in storage 230. Alternatively, prediction data 264 may be stored entirely in memory 225 or entirely in storage 230. The prediction data 264 may include output data, such as predicted output tuples, which may be substituted for output tuples of an operator graph in event of a processing condition in a stream computing application. By substituting predicted output tuples in lieu of output tuples the operator sub-graph is bypassed. In an embodiment, the processing condition may be the existence of backpressure, or latency, in the stream computing application. In an embodiment, the processing condition may include a latency threshold, where, if a number of tuples to be processed in an operator graph is greater than the latency threshold, the processing condition is triggered. The substitution of prediction data 264 may decrease latency and backpressure in the stream computing application.

The prediction data 264 may be one or more predicted output tuples having one or more attributes. In an embodiment, prediction data 264 may include one attribute of an output tuple. In other embodiments, prediction data 264 may include two or more attributes of an output tuple. In some embodiments, the prediction data 264 may be data which is pre-programmed and arranged in a prediction table and selected as predicted output tuples by the processing elements 235. One or more processing elements 235 may retrieve prediction data 364 from the storage 230 and transmit the prediction data 264 downstream in a stream computing application. However in other embodiments, the prediction data 264 may be generated using historical values of output tuples, described further below. For example, the prediction data 264 may be an average, median, or a mode, of previously computed output tuples for a particular time period, such as peak usage hours, or output tuples that correspond to a particular input tuple received by the processing element 235. In an embodiment, the prediction data may be generated by the stream manager 134 (FIG. 1). In another embodiment, the prediction data may be generated by the processing elements 235. In other embodiments the prediction data may be generated by a predictive system, such as SPSS software, external to the computing infrastructure 100.

Figure 3:
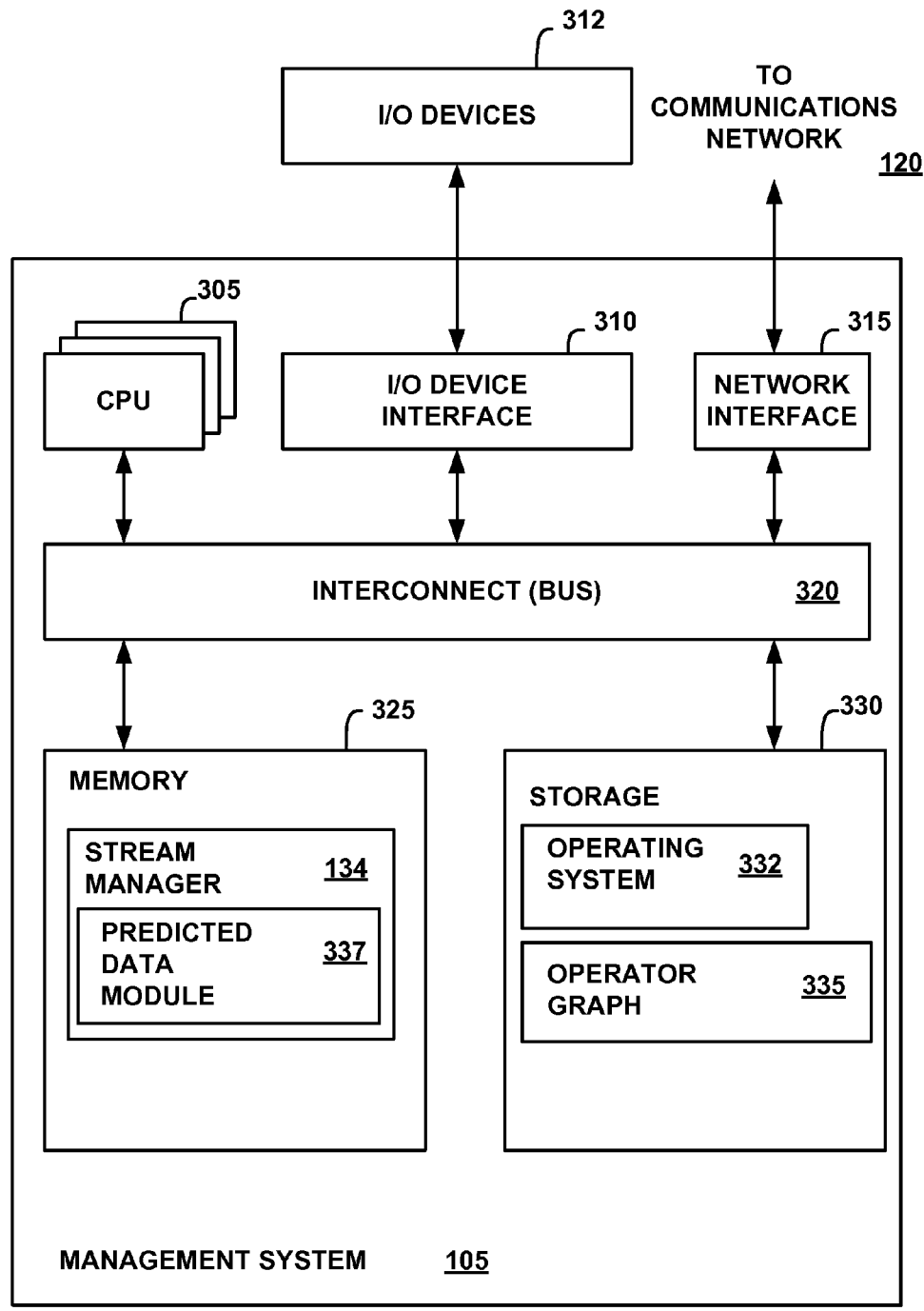
FIG. 3 illustrates a more detailed view of the management system of FIG. 1 according to various embodiments.

FIG. 3 is a more detailed view of the management system 105 of FIG. 1 according to some embodiments. The management system 105 may include, without limitation, one or more processors (CPUs) 305, a network interface 315, an interconnect 320, a memory 325, and a storage 330. The management system 105 may also include an I/O device interface 310 connecting I/O devices 312, e.g., keyboard, display, and mouse devices, to the management system 105.

Each CPU 305 retrieves and executes programming instructions stored in the memory 325 or storage 330. Similarly, each CPU 305 stores and retrieves application data residing in the memory 325 or storage 330. The interconnect 320 is used to move data, such as programming instructions and application data, between the CPU 305, I/O device interface 310, storage unit 330, network interface 315, and memory 325. The interconnect 320 may be one or more busses. The CPUs 305 may be a single CPU, multiple CPUs, or a single CPU having multiple processing cores in various embodiments. In one embodiment, a processor 305 may be a DSP. Memory 325 is generally included to be representative of a random access memory, e.g., SRAM, DRAM, or Flash. The storage 330 is generally included to be representative of a non-volatile memory, such as a hard disk drive, solid state device (SSD), removable memory cards, optical storage, Flash memory devices, network attached storage (NAS), connections to storage area-network (SAN) devices, or the cloud. The network interface 315 is configured to transmit data via the communications network 120.

The memory 325 may store a stream manager 134. Additionally, the storage 330 may store an operator graph 335. The operator graph 335 may define how tuples are routed to processing elements 235 (FIG. 2) for processing.

The stream manager 134 may include a predicted data module 337 which may include logic for accessing prediction data 264 (FIG. 2) for a processing element 235. The stream manager 134 may monitor backpressure in the operator graph and may determine whether latency needs to be improved. For example, a processing element 235 which is unable to process tuples as fast as they are received may cause unprocessed tuples to fill up the buffer. The stream manager 134 may direct a first processing element of the processing elements 235 to cease processing of some percentage of the tuples and direct the first processing element or another processing element 235 to transmit prediction data 264 in substitution for typical output tuples. The unprocessed tuples may then be discarded.

In an embodiment, the stream manager 134 may determine whether a processing condition exists in the operator graph. The processing condition may be various conditions involving the stream computing application. In an embodiment, the processing condition signals backpressure or latency in the operator graph. The processing condition may be based on various information about the operator graph. In an embodiment the processing condition may include determining whether the number of tuples to be processed in the operator graph is greater than a latency threshold. In an embodiment, the latency threshold may be 500,000 queued tuples in the operator graph so that if the number of tuples to be processed is greater than 500,000 queued tuples, the processing condition is triggered. In an embodiment, the latency threshold may be 500,000 queued tuples in the operator sub-graph graph so that if the number of tuples to be processed is greater than 500,000 queued tuples, the processing condition is triggered. In another embodiment the processing condition may be determining whether the used buffer capacity parameter in a compute node 110 is greater than a buffer threshold. In an embodiment, the buffer threshold may be 90% used capacity in the buffer so that if the used buffer capacity parameter is greater than 90% the processing condition is triggered. However, other types of processing conditions may be used.

The predicted data module 337 may also include logic used by the stream manager 134 to generate prediction data 264 for the processing elements 235. The prediction data 264 may be generated from various types of historical values of tuples in the operator graph. The prediction data 264 may be the result of a statistical operation. In an embodiment, the predicted data module 337 may compute the average for a plurality of previously transmitted output values or determine the mode of the output values. The predicted data module 337 may continually generate prediction data 264 for each processing element 235 in an operator graph, or generate predicted output data only after the stream manager 134 has determined that a processing condition exists in the operator graph 335. When the processing condition is no longer true, the stream manager may direct the first processing element of the processing elements 235 to resume processing of some percentage of the tuples and direct the first processing element or another processing element 235 to output typical output tuples.

The management system 105 may include one or more operating systems 332. An operating system 332 may be stored partially in memory 325 and partially in storage 330. Alternatively, an operating system may be stored entirely in memory 325 or entirely in storage 330. The operating system provides an interface between various hardware resources, including the CPU 305, and processing elements and other components of the stream computing application. In addition, an operating system provides common services for application programs, such as providing a time function.

Figure 4:
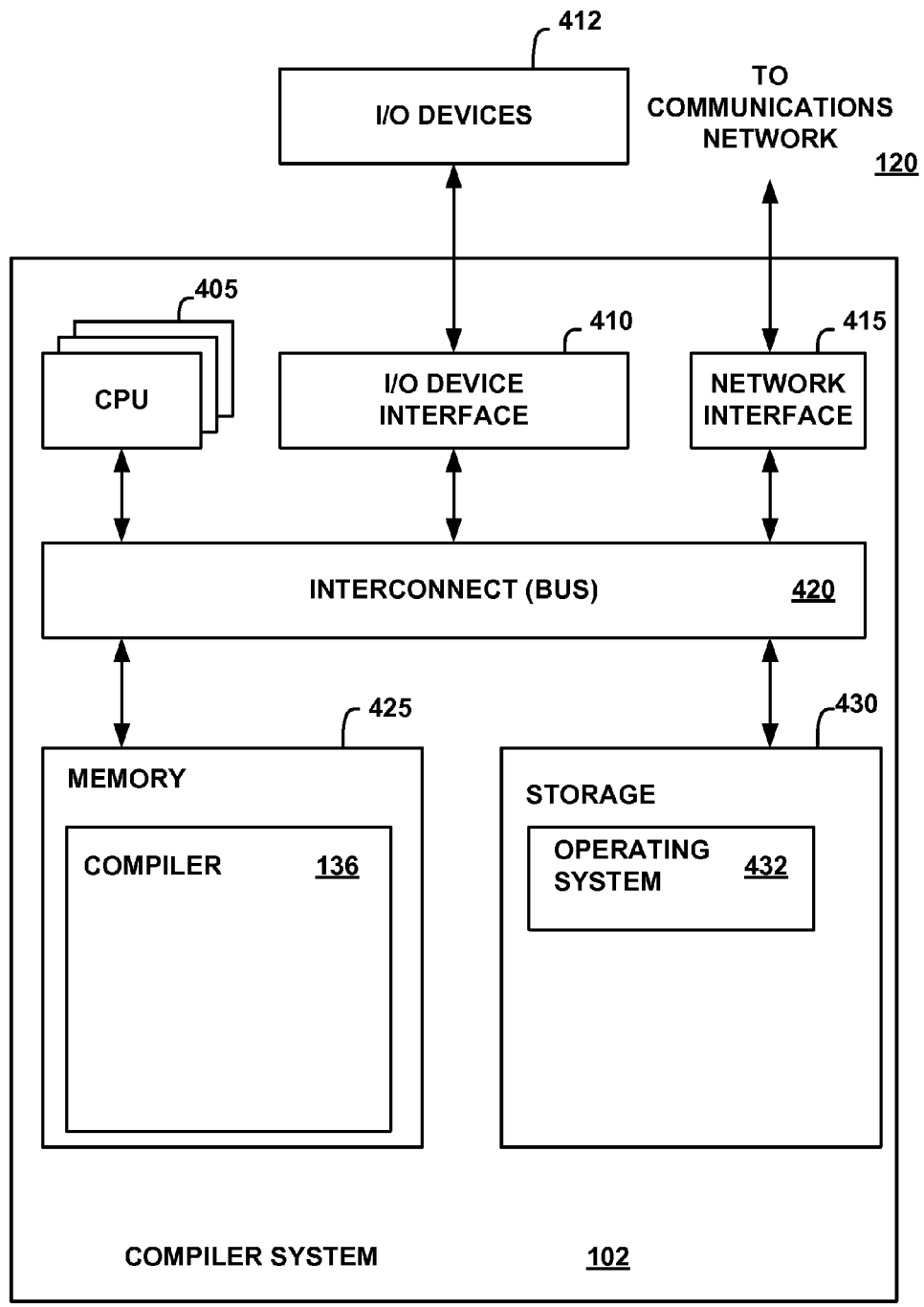
FIG. 4 illustrates a more detailed view of the compiler system of FIG. 1 according to various embodiments.

FIG. 4 is a more detailed view of the compiler system 102 of FIG. 1 according to some embodiments. The compiler system 102 may include, without limitation, one or more processors (CPUs) 405, a network interface 415, an interconnect 420, a memory 425, and storage 430. The compiler system 102 may also include an I/O device interface 410 connecting I/O devices 412, e.g., keyboard, display, and mouse devices, to the compiler system 102.

Each CPU 405 retrieves and executes programming instructions stored in the memory 425 or storage 430. Similarly, each CPU 405 stores and retrieves application data residing in the memory 425 or storage 430. The interconnect 420 is used to move data, such as programming instructions and application data, between the CPU 405, I/O device interface 410, storage unit 430, network interface 415, and memory 425. The interconnect 420 may be one or more busses. The CPUs 405 may be a single CPU, multiple CPUs, or a single CPU having multiple processing cores in various embodiments. In one embodiment, a processor 405 may be a DSP. Memory 425 is generally included to be representative of a random access memory, e.g., SRAM, DRAM, or Flash. The storage 430 is generally included to be representative of a non-volatile memory, such as a hard disk drive, solid state device (SSD), removable memory cards, optical storage, flash memory devices, network attached storage (NAS), connections to storage area-network (SAN) devices, or to the cloud. The network interface 415 is configured to transmit data via the communications network 120.

The compiler system 102 may include one or more operating systems 432. An operating system 432 may be stored partially in memory 425 and partially in storage 430. Alternatively, an operating system may be stored entirely in memory 425 or entirely in storage 430. The operating system provides an interface between various hardware resources, including the CPU 405, and processing elements and other components of the stream computing application. In addition, an operating system provides common services for application programs, such as providing a time function.

The memory 425 may store a compiler 136. The compiler 136 compiles modules, which include source code or statements, into the object code, which includes machine instructions that execute on a processor. In one embodiment, the compiler 136 may translate the modules into an intermediate form before translating the intermediate form into object code. The compiler 136 may output a set of deployable artifacts that may include a set of processing elements and an application description language file (ADL file), which is a configuration file that describes the stream computing application. In some embodiments, the compiler 136 may be a just-in-time compiler that executes as part of an interpreter. In other embodiments, the compiler 136 may be an optimizing compiler. In various embodiments, the compiler 136 may perform peephole optimizations, local optimizations, loop optimizations, inter-procedural or whole-program optimizations, machine code optimizations, or any other optimizations that reduce the amount of time required to execute the object code, to reduce the amount of memory required to execute the object code, or both.

The output of the compiler 136 may be represented by an operator graph, e.g., the operator graph 335. The compiler 136 may compile a code for initializing a streaming application, the compiling of the code may include establishing an operator graph of a plurality of processing elements including a first processing element and a second processing element. The operator graph may include an operator sub-graph containing one or more processing elements from the plurality of stream operators. The operator sub-graph may be configured to receive an input tuple from a processing element of the operator graph and configured to transmit an output tuple to the second processing element. The compiling of code also including modifying the first processing element to bypass the operator sub-graph by transmitting a predicted output tuple to the second processing element in response to determining that a processing condition exists in the plurality of processing elements. The first processing element may be located out of the operator sub-graph. In other embodiments, the first processing element may be located in the operator sub-graph and may bypass the operator sub-graph. Bypassing the operator sub-graph means substituting the output tuple of the operator sub-graph with the predicted output tuple from the first processing element.

The compiler 136 may be configured to receive one or more compiler directives from a developer. The compiler directives may instruct the compiler 136 on how the compiler 136 should process the code. The compiler 136 may be configured to receive a first compiler directive which may specify the operator sub-graph. The first compiler directive may cause the compiler to add a tag to compiled code associated with the operator sub-graph. The operator sub-graph may include one or more processing elements 235 (FIG. 2) from the operator graph. The compiler 136 may also be configured to receive a second compiler directive specifying a first processing element to bypass the operator sub-graph by transmitting a predicted output tuple to the second processing element in response to determining that a processing condition exists in the operator graph. The second compiler directive may cause the compiler to add instructions to compiled code associated with the first processing element. The compiler may also be configured to receive a third compiler directive which may specific a processing condition for the operator graph. The third compiler directive may cause the compiler to add instructions and the processing condition to compiled code associated with the stream manager or with a processing element. The processing condition may be the same or substantially similar as described herein. In an embodiment, the second compiler directive may specify a processing condition for the operator sub-graph or other portion of the operator graph.

The compiler 136 may also provide the application administrator with the ability to optimize performance through profile-driven fusion optimization. Fusing operators may improve performance by reducing the number of calls to a transport. While fusing stream operators may provide faster communication between operators than is available using inter-process communication techniques, any decision to fuse operators requires balancing the benefits of distributing processing across multiple compute nodes with the benefit of faster inter-operator communications. The compiler 136 may automate the fusion process to determine how to best fuse the operators to be hosted by one or more processing elements, while respecting user-specified constraints. This may be a two-step process, including compiling the application in a profiling mode and running the application, then re-compiling and using the optimizer during this subsequent compilation. The end result may, however, be a compiler-supplied deployable application with an optimized application configuration.

Figure 5A:
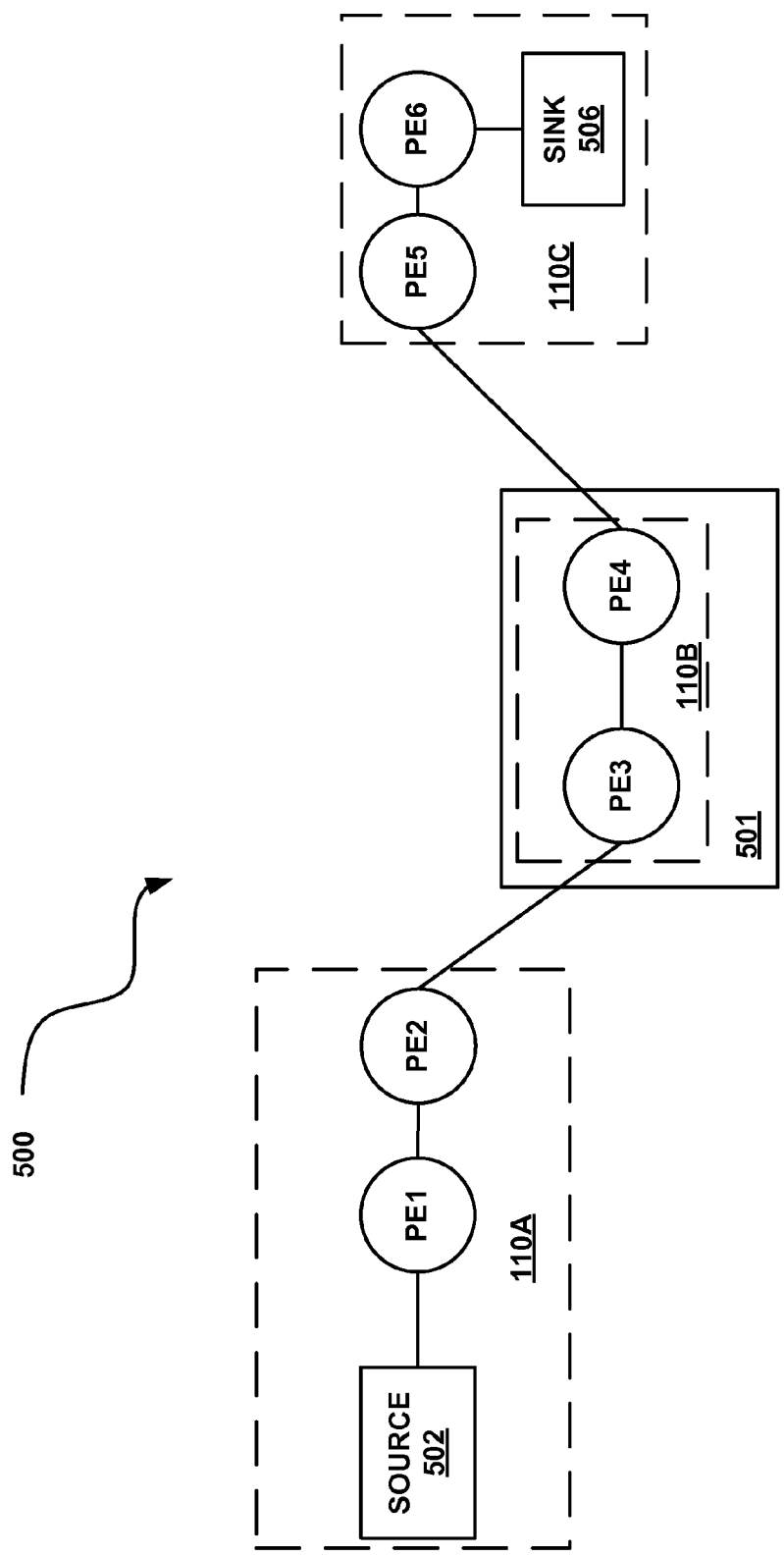
FIG. 5A illustrates an operator graph and operator sub-graph for a stream computing application according to various embodiments.
Figure 5B:
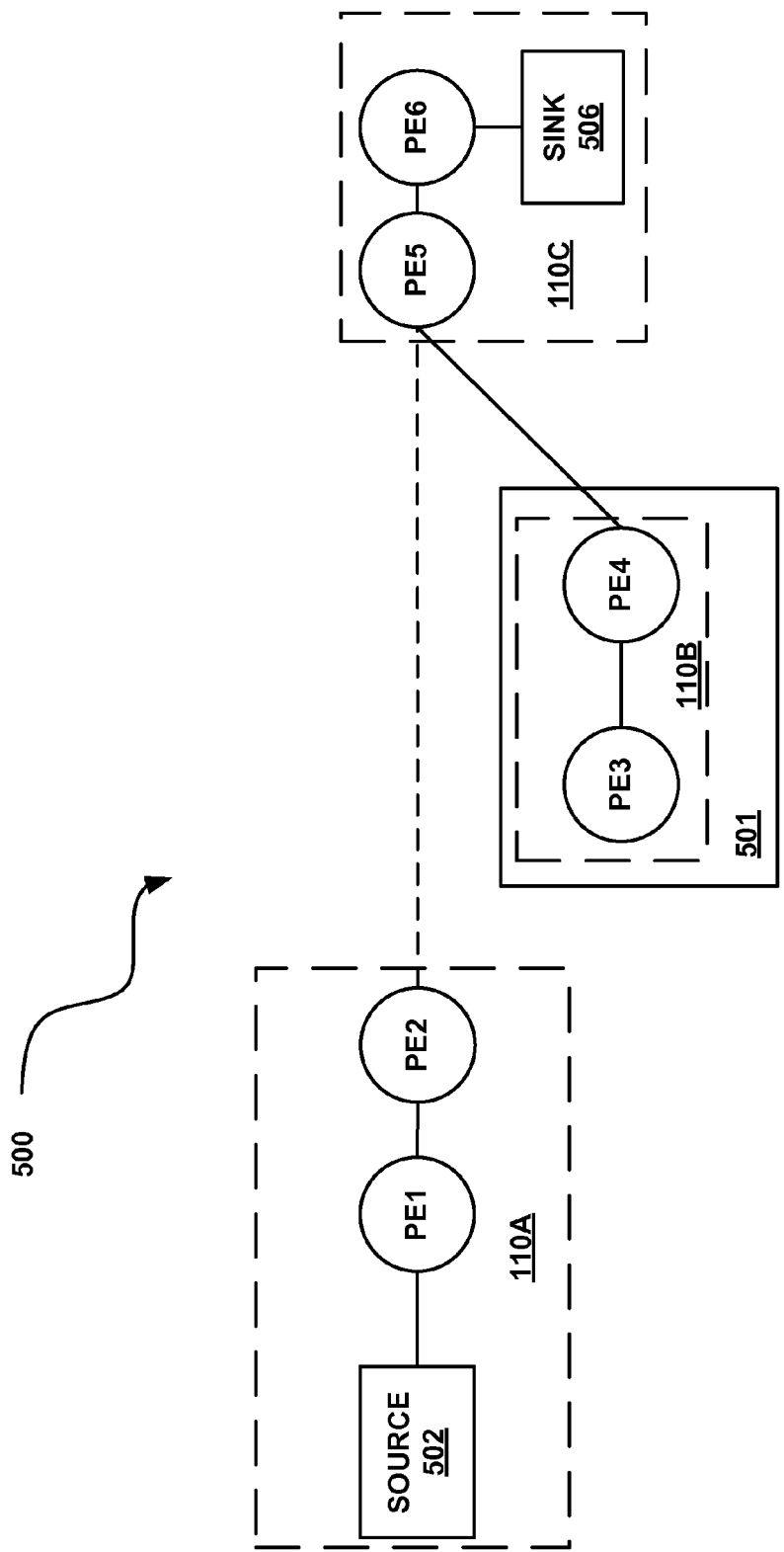
FIG. 5B illustrates an operator graph and bypassed operator sub-graph for a stream computing application according to various embodiments.

FIGS. 5A and 5B illustrate an operator graph 500 for a stream computing application beginning from source 502 through to sink 506, according to some embodiments. This flow from source to sink may also be generally referred to herein as an execution path. In addition, a flow from one processing element to another may be referred to as an execution path in various contexts. Although FIGS. 5A and 5B are abstracted to show connected processing elements PE1-PE6, the operator graph 500 may include data flows between stream operators 240 (FIG. 2) within the same or different processing elements. Typically, processing elements, such as processing element 235 (FIG. 2), receive tuples from the stream as well as output tuples into the stream (except for a sink—where the stream terminates, or a source—where the stream begins). While the operator graph 500 includes a relatively small number of components, an operator graph may be much more complex and may include many individual operator graphs that may be statically or dynamically linked together.

The example operator graph shown in FIGS. 5A and 5B include six processing elements (labeled as PE1-PE6) running on the compute nodes 110A-110C. A processing element may include one or more stream operators fused together to form an independently running process with its own process ID (PID) and memory space. In cases where two (or more) processing elements are running independently, inter-process communication may occur using a "transport," e.g., a network socket, a TCP/IP socket, or shared memory. Inter-process communication paths used for inter-process communications can be a critical resource in a stream computing application. However, when stream operators are fused together, the fused stream operators can use more rapid communication techniques for passing tuples among stream operators in each processing element.

The operator graph 500 begins at a source 502 and ends at a sink 506. Compute node 110A includes the processing elements PE1 and PE2. Source 502 flows into the processing element PE1, which in turn outputs tuples that are received by PE2. For example, PE1 may split pass data attributes received in a tuple unchanged to PE2. In another example, PE1 may change value of one or more attributes and pass some data attributes unchanged in a new tuple to PE2. In another example, one or more attributes may be added to the tuple or dropped from the tuple and then passed to PE2. In another example, a new attribute based on PE1's processing may be added to the tuple. Tuples that flow to PE2 are processed by the stream operators contained in PE2. The resulting tuples may then be outputted to PE3 on compute node 110B as shown in FIG. 5A. In FIG. 5A, the tuples entering compute node 110B may flow to PE3 and through to PE4. PE4 may output tuples to compute node 110C. Tuples entering compute node 110C flow to PE5 through to PE6 and to operator sink 506.

However, the processing element PE2 may be specified to bypass compute node 110B as shown in FIG. 5B. In FIG. 5B predicted output tuples may be outputted to PE5 on compute node 110C. The predicted output tuples may be contained in the compute nodes 110A, 110B, 110C. In an embodiment, the predicted output tuples may be outputted from PE2 in compute node 110A. In another embodiment the predicted output tuples may be outputted from PE4 in compute node 110B. In another embodiment, PE5 may select predicted output tuples as inputs in compute node 110C. The bypassing of compute node 110B may be based on the existence of a processing condition as discussed further below. Tuples entering compute node 110C flow to PE5 through to PE6 and to operator sink 506.

Various portions of the operator graph 500 may be in operator sub-graph 501. In an embodiment, the operator sub-graph 501 may include compute node 110B. However, in other embodiments the operator sub-graph 501 may include one or more processing elements of the operator graph 500. The operator sub-graph may be created by the compiler in the compiling of code as described above. In an embodiment, the compiler may receive a first compiler directive which may specify the one or more processing elements in the operator sub-graph. Compute node 110A may include a first processing element PE2 which may be configured to bypass the operator sub-graph in response to determining that the processing condition exists in the operator graph. Whether the processing condition exists in the operator graph may be determined by the stream monitor, described herein, by the processing elements of the operator graph, or other suitable element. In other embodiments, the processing condition may be determined by processing elements, e.g. PE2 or PE3.

The processing condition may be various conditions involving the stream computing application. In an embodiment, the processing condition may be determining that a number of tuples to be processed in the operator graph is greater than a latency threshold. In some embodiments, the processing condition may be based on the number of tuples to be processed in the operator sub-graph or other area in the operator graph. In another embodiment, the processing condition may be based on processing elements which are upstream from the operator sub-graph.

In an embodiment the latency threshold may be selected as 500,000 tuples to be processed by the operator sub-graph so that if the number of tuples to be processed is greater than 500,000 queued tuples, the processing condition is triggered. In another embodiment the processing condition may be determining whether a used buffer capacity parameter is greater than a buffer threshold. In an embodiment, the buffer threshold may be 90% used capacity in the buffer so that if the used buffer capacity parameter is greater than 90% the processing condition is triggered. In other embodiments, the processing condition may be determining whether the predicted time required to process the input tuple is greater than a time threshold. In another embodiment, the processing condition may be determining that a CPU usage of the plurality of processing elements is greater than a CPU threshold.

As described above, the stream manager 134 (FIG. 1) may determine when the processing condition is triggered. The stream manager 134 may be configured to monitor a stream computing application running on the compute nodes, e.g., compute nodes 110A-110C, as well as to change the deployment of an operator graph, e.g., operator graph 132. The stream manager 134 may move processing elements from one compute node 110 to another, for example, to manage the processing loads of the compute nodes 110A-110C in the computing infrastructure 100. Further, stream manager 134 may control the stream computing application by inserting, removing, fusing, un-fusing, or otherwise modifying the processing elements and stream operators (or what tuples flow to the processing elements) running on the compute nodes 110A-110C. In an embodiment, when the processing condition is detected by the stream manager 134 the stream manager may direct the flow of tuples to bypass the operator sub-graph 501 by sending prediction data 264 from the processing elements 235 to PE5 in lieu of normal output tuples from the operator sub-graph.

However, in other embodiments, the compute node 110 or the processing elements 235 may also determine when the processing condition is triggered e.g., PE2 or PE3. In some embodiments, when the processing condition is triggered, the processing elements of compute node 110 may substitute prediction data such as predicted output tuples to bypass the operator sub-graph 501. The computer node may include prediction data 264 and the processing elements of the compute node 110 may have access to the prediction data. In FIGS. 5A and 5B Processing element PE5 may receive predicted output tuples from the processing elements of compute node 110A when the processing condition is triggered. Thus, the stream computing application may increase data throughput and reduce latency in the stream computing application.

Processing elements 235 (FIG. 2) may be configured to receive or output tuples in various formats, e.g., the processing elements or stream operators could exchange data marked up as XML documents. Furthermore, each stream operator 240 within a processing element 235 may be configured to carry out any form of data processing functions on received tuples, including, for example, writing to database tables or performing other database operations such as data joins, splits, reads, etc., as well as performing other data analytic functions or operations.

Because a processing element may be a collection of fused stream operators, it is equally correct to describe the operator graph as one or more execution paths between specific stream operators, which may include execution paths to different stream operators within the same processing element. FIGS. 5A and 5B illustrate execution paths between processing elements for the sake of clarity.

Figure 6:
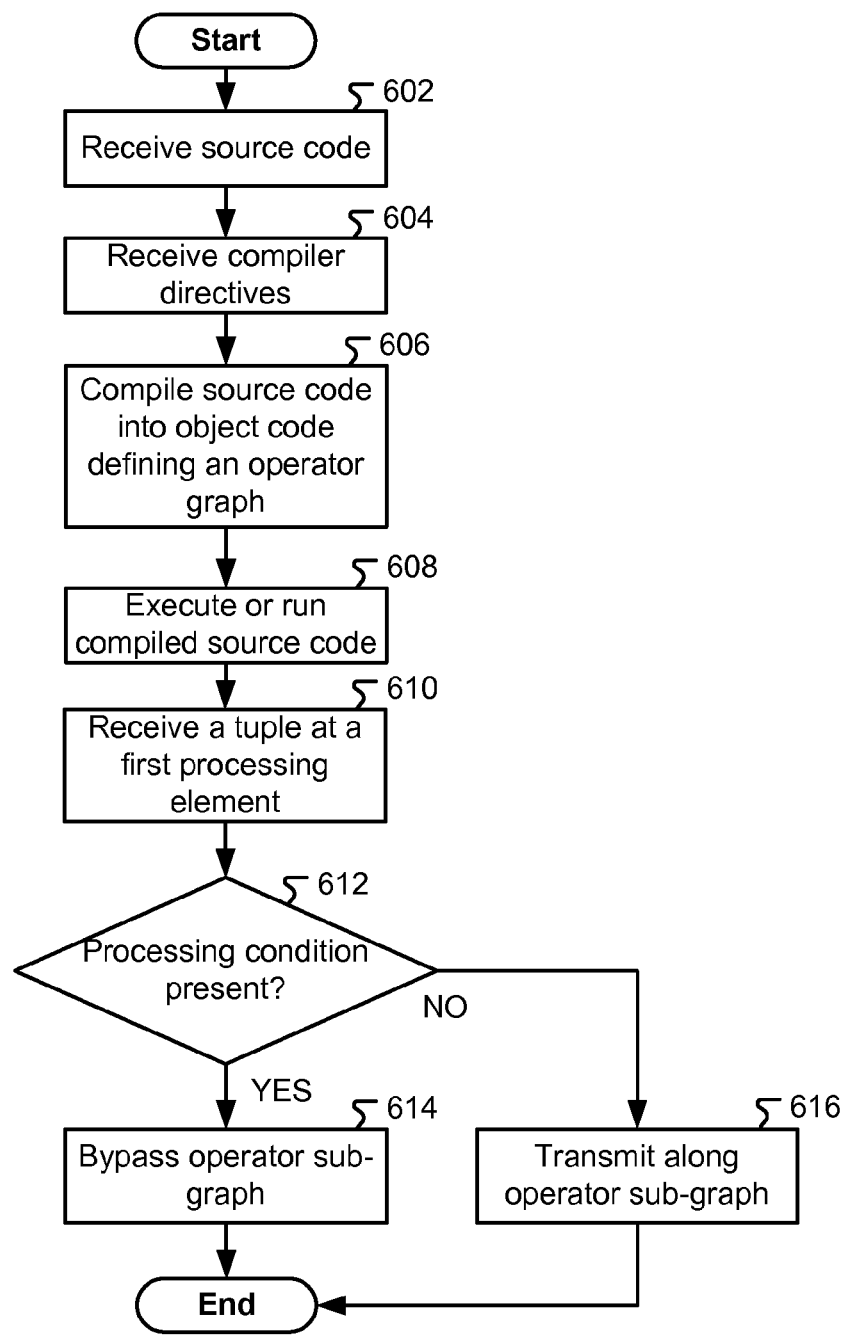
FIG. 6 illustrates a flow chart diagram for a method of initializing a streaming application, the method including compiling code on a compiler system.

Referring now to FIG. 6 a flow chart diagram of a method for initializing a streaming application, the method including compiling code on a compiler system, according to an embodiment. In operation 602, source code may be received. The source code may include executable statements such as machine instructions that execute on a processor. As described above, the source code may be compiled in a compiler 136 (FIG. 1).

In operation 604, compiler directives may be received. The compiler 136 (FIG. 1) may be configured to receive one or more compiler directives from a developer. The compiler directives may instruct the compiler 136 on how the compiler 136 should process the source code. The compiler 136 may be configured to receive a first compiler directive which may specify an operator sub-graph. The operator sub-graph may be a subset of the operator graph and may include one or more processing elements of the operator graph. The first compiler directive may cause the compiler to add a tag to compiled code associated with the operator sub-graph. The operator sub-graph may include one or more processing elements 235 (FIG. 2) from the operator graph.

The compiler 136 may also be configured to receive a second compiler directive specifying a first processing element to bypass the operator sub-graph by transmitting a predicted output tuple to the second processing element in response to determining that a processing condition exists in the operator graph. The second compiler directive may cause the compiler to add instructions to compiled code associated with the first processing element. The compiler may also be configured to receive a third compiler directive which may specific a processing condition for the operator graph. The third compiler directive may cause the compiler to add instructions and the processing condition to compiled code associated with the stream manager or with a processing element. The processing condition may be the same or substantially similar as described herein. In an embodiment, the second compiler directive may specify a processing condition for the operator sub-graph or other portion of the operator graph. Commonly, the compiler directives may be provided in the source code itself via a tag in the code.

In operation 606, the source code may be compiled into object code defining the operator graph. As described above, the operator graph may represent the flow of data through the stream computing application and may define how tuples are routed to processing elements 235 (FIG. 2) for processing. The operator graph may include one or more processing elements. The one or more processing elements may include one or more stream operators. The operator graph may include at least a first processing element and a second processing element. However, the operator graph may include a plurality of processing elements, as described above. The source code may also be compiled into object code defining an operator sub-graph. Various portions of the operator graph may be an operator sub-graph. The operator sub-graph may include one or more processing elements of the operator graph. The operator sub-graph may be created by the compiler in the compiling of code as described above. The operator sub-graph may be configured to receive an input tuple from a processing element of the operator graph and transmit an output tuple to the second processing element. In operation 608, source code may be executed.

In operation 610, an input tuple may be received at a first processing element. The input tuple may be received from a stream source or as an output from another processing element upstream from the first processing element.

If a processing condition is present in the streaming application then, in decision block 612, the method 600 may progress to operation 614. The first processing element may be configured to transmit predicted output data when the processing condition is detected in the operator sub-graph. The first processing element may be identified at compile time, as the compiler may be configured to receive a second compiler directive specifying a first processing element to bypass the operator sub-graph. The first processing element may be located out of the operator sub-graph. In other embodiments, the first processing element may be located in the operator sub-graph and may bypass the operator sub-graph. Bypassing the operator sub-graph means substituting the output tuple of the operator sub-graph with the predicted output tuple from the first processing element.

The processing condition may be detected by the stream manager, as described above or by other suitable element in the operator graph. The processing condition may be various conditions involving the stream computing application. In an embodiment, the processing condition may be determining that a number of tuples to be processed in the operator graph is greater than a latency threshold. In an embodiment the latency threshold may be 500,000 queued tuples so that if the number of tuples to be processed is greater than 500,000 queued tuples, the processing condition is triggered. However, other processing conditions may be used depending upon the preferences of the steam computing application. The processing condition may be identified at compile time. The compiler may also be configured to receive a third compiler directive which may specific a processing condition for the operator graph. The processing condition may be the same or substantially similar as described herein. In an embodiment, the second compiler directive may specify a processing condition for the operator sub-graph or other portion of the operator graph.

In operation 614, the operator sub-graph may be bypassed. The operator sub-graph may be bypassed by modifying the first processing element to bypass the operator sub-graph and transmit tuples a second processing element, described above. The first processing element may be located out of the operator sub-graph. In other embodiments, the first processing element may be located in the operator sub-graph and may bypass the operator sub-graph. Bypassing the operator sub-graph means substituting the output tuple of the operator sub-graph with the predicted output tuple from the first processing element. In response to receiving tuples the first processing element may look to the prediction data, as described above, and transmit a predicted output tuple stored in prediction data in lieu of generated output tuples from the operator sub-graph. Thus, a predicted output tuple may be received at a second processing element.

If the processing condition is not present then, in decision block 612, the method 600 may progress to operation 616. In operation 616 the first processing element may transmit tuples along the operator sub-graph. If no processing condition exists, such as queued tuples, then the operator graph may not have latency and the method may not require the operator graph to sacrifice accuracy for improved throughput. Therefore, the operator graph may transmit tuples using the operator sub-graph and may generate output tuples instead of substituting predicted results.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s).

Aspects of the present disclosure may be embodied as a system, method, or computer program product. Accordingly, aspects of the present disclosure may take the form of an entirely hardware embodiment, an entirely software embodiment (including firmware, resident software, micro-code, etc.), or an embodiment combining software and hardware aspects that may all generally be referred to herein as a "circuit," "module," or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination thereof. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination thereof. In the context of this disclosure, a computer readable storage medium may be any tangible medium that can contain, or store, a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wire line, optical fiber cable, RF, etc., or any suitable combination thereof.

Computer program code for carrying out operations for aspects of the present disclosure may be written in any combination of one or more programming languages, including: (a) an object oriented programming language; (b) conventional procedural programming languages; and (c) a streams programming language, such as IBM Streams Processing Language (SPL). The program code may execute as specifically described herein. In addition, the program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure have been described with reference to flowchart illustrations, block diagrams, or both, of methods, apparatuses (systems), and computer program products according to embodiments of this disclosure. It will be understood that each block of the flowchart illustrations or block diagrams, and combinations of blocks in the flowchart illustrations or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus, or other devices to produce a computer implemented process such that the instructions which execute on the computer or other programmable apparatus provide processes for implementing the functions or acts specified in the flowchart or block diagram block or blocks.

Embodiments according to this disclosure may be provided to end-users through a cloud-computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud-computing resources are provided to a user on a pay-per-use basis, where users are charged only for the computing resources actually used (e.g., an amount of storage space used by a user or a number of virtualized systems instantiated by the user). A user can access any of the resources that reside in the cloud at any time, and from anywhere across the Internet. In context of the present disclosure, a user may access applications or related data available in the cloud. For example, the nodes used to create a stream computing application may be virtual machines hosted by a cloud service provider. Doing so allows a user to access this information from any computing system attached to a network connected to the cloud (e.g., the Internet).

The flowchart and block diagrams in the figures illustrate the architecture, functionality, and operation of possible implementations of systems, methods, and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, can be implemented by special purpose hardware-based systems that perform the specified functions or acts, or combinations of special purpose hardware and computer instructions.

Although embodiments are described within the context of a stream computing application, this is not the only context relevant to the present disclosure. Instead, such a description is without limitation and is for illustrative purposes only. Additional embodiments may be configured to operate with any computer system or application capable of performing the functions described herein. For example, embodiments may be configured to operate in a clustered environment with a standard database processing application. A multi-nodal environment may operate in a manner that effectively processes a stream of tuples. For example, some embodiments may include a large database system, and a query of the database system may return results in a manner similar to a stream of data.

While the foregoing is directed to exemplary embodiments, other and further embodiments of the disclosure may be devised without departing from the basic scope thereof, and the scope thereof is determined by the claims that follow.

What is claimed is:

1. A method for initializing a streaming application, the method including compiling code on a compiler system, the compiling of the code comprising:

establishing an operator graph having a plurality of processing elements including a first processing element and a second processing element;

receiving a first compiler directive specifying an operator sub-graph included in the operator graph, the operator sub-graph containing one or more processing elements from the plurality of processing elements, the operator sub-graph configured to receive an input tuple and configured to transmit an output tuple to the second processing element of the operator graph; and receiving a second compiler directive identifying the first processing element, the first processing element configured to bypass the operator sub-graph by transmitting a predicted output tuple to the second processing element in response to determining that a processing condition exists in the operator graph.

2. The method of claim 1, wherein the first processing element is configured to bypass the operator sub-graph in response to determining that a processing condition exists in the operator sub-graph.

3. The method of claim 1, further comprising receiving a third compiler directive specifying the processing condition for the operator graph.

4. The method of claim 1, wherein the processing condition is determining that a number of tuples to be processed in the operator graph is greater than a latency threshold.

5. The method of claim 1, wherein the processing condition is determining that a used buffer capacity parameter is greater than a buffer threshold.

6. The method of claim 1, wherein the processing condition is determining predicted time required to process the input tuple is greater than a time threshold.

7. The method of claim 1, wherein the processing condition is determining that a CPU usage of the plurality of processing elements is greater than a CPU threshold.

8. The method of claim 1, wherein the predicted output tuple is selected from one or more predicted output tuples stored in a prediction table.

9. The method of claim 1, wherein the predicted output tuple is selected based on historical values of output tuples.

10. The method of claim 1, wherein the predicted output tuple is selected based on a received input tuple.

11. A computer program product for processing a stream of tuples, the computer program product comprising a non-transitory computer readable storage medium having program code embodied therewith, the program code comprising computer readable program code configured at compile time to:

establish an operator graph having a plurality of processing elements including a first processing element and a second processing element;

transmit a first compiler directive specifying an operator sub-graph included in the operator graph, the operator sub-graph containing one or more processing elements from the plurality of processing elements, the operator sub-graph configured to receive an input tuple and configured to transmit an output tuple to the second processing element of the operator graph; and transmit a second compiler directive identifying the first processing element, the first processing element configured to bypass the operator sub-graph by transmitting a predicted output tuple to the second processing element in response to determining that a processing condition exists in the operator graph.

12. The computer program product of claim 11, wherein the first processing element is configured to bypass the operator sub-graph in response to determining that a processing condition exists in the operator sub-graph.

13. The computer program product of claim 11, wherein the code is further configured to transmit a third compiler directive specifying the processing condition for the operator graph.

14. The computer program product of claim 11, wherein the processing condition is determining that a number of tuples to be processed in the operator graph is greater than a latency threshold.

15. The computer program product of claim 11, wherein the processing condition is determining that a used buffer capacity parameter is greater than a buffer threshold.

16. The computer program product of claim 11, wherein the predicted output tuple is selected based on historical values of output tuples.

* * * * *